(12) United States Patent
Leuthold et al.

(10) Patent No.: US 9,865,298 B2
(45) Date of Patent: Jan. 9, 2018

(54) CONICAL PUMPING SEAL

(71) Applicant: Seagate Technology LLC, Cupertino, CA (US)

(72) Inventors: Hans Leuthold, Santa Cruz, CA (US); Lynn Bich-Quy Le, San Jose, CA (US); Chris M. Woldemar, Santa Cruz, CA (US)

(73) Assignee: Seagate Technology LLC, Cupertino, CA (US)

( * ) Notice: Subject to any disclaimer, the term of this patent is extended or adjusted under 35 U.S.C. 154(b) by 132 days.

(21) Appl. No.: 14/210,176

(22) Filed: Mar. 13, 2014

(65) Prior Publication Data
US 2015/0260293 A1 Sep. 17, 2015

(51) Int. Cl.
*F16C 32/06* (2006.01)
*G11B 19/20* (2006.01)
*F16C 33/10* (2006.01)
*F16C 17/10* (2006.01)

(52) U.S. Cl.
CPC ........ *G11B 19/2036* (2013.01); *F16C 17/105* (2013.01); *F16C 33/107* (2013.01)

(58) Field of Classification Search
CPC ..... F16J 15/164; F16C 33/10; F16C 33/1025; F16C 33/106; F16C 33/1085; G11B 19/2036
See application file for complete search history.

(56) References Cited

U.S. PATENT DOCUMENTS

| | | | |
|---|---|---|---|
| 8,473,505 B2 | 6/2013 | Brucker et al. | |
| 8,711,514 B2 | 4/2014 | Iwasaki et al. | |
| 8,724,257 B2 | 5/2014 | Sekii et al. | |
| 2005/0207060 A1* | 9/2005 | Leblanc | G11B 19/2018 360/99.08 |
| 2005/0218735 A1* | 10/2005 | Herndon | F16C 33/103 310/90 |
| 2006/0255672 A1* | 11/2006 | Flores | F16C 33/107 310/90 |
| 2008/0037917 A1* | 2/2008 | Hendriks | F16C 17/10 384/107 |
| 2009/0279818 A1* | 11/2009 | Le | F16C 33/107 384/112 |
| 2013/0242429 A1 | 9/2013 | Iwasaki et al. | |
| 2013/0259413 A1 | 10/2013 | Le et al. | |
| 2014/0133789 A1 | 5/2014 | Le et al. | |

* cited by examiner

*Primary Examiner* — Gilbert Y Lee

(57) ABSTRACT

Provided herein is an apparatus, including a stationary component, a rotatable component configured to rotate relative to the stationary component, and a conical pumping seal formed between the stationary component and the rotatable component.

20 Claims, 6 Drawing Sheets

CONICAL PUMPING SEAL

BACKGROUND

An electric motor may use stators, magnets, and/or coils to rotate an object. For example, a motor may rotate data storage disks used in a disk drive storage device. The data storage disks may be rotated at high speeds during operation using the stators, magnets, and/or coils. For example, magnets and coils may interact with a stator to cause rotation of the disks relative to the stator.

In some cases, electric motors are manufactured with increasingly reduced sizes. For example, in order to reduce the size of a disk drive storage device, the size of various components of the disk drive storage device may be reduced. Such components may include the electric motor, stator, magnets, and/or coils. The precision at which the components are manufactured can affect the reliability and performance of the electric motor.

SUMMARY

Provided herein is an apparatus, including a stationary component, a rotatable component configured to rotate relative to the stationary component, and a conical pumping seal formed between the stationary component and the rotatable component.

These and other features and aspects may be better understood with reference to the following drawings, description, and appended claims.

DRAWINGS

Figure 1:
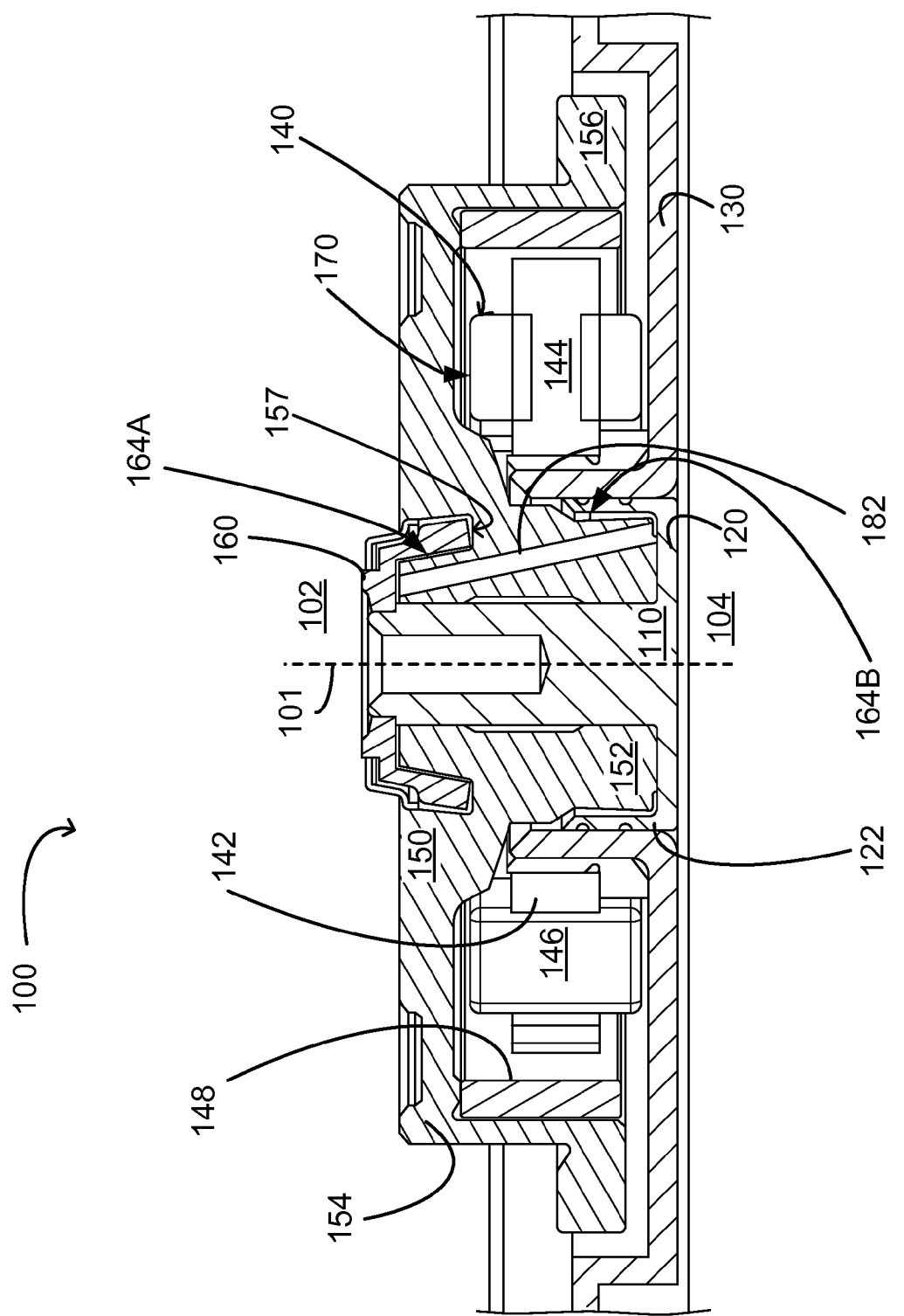

FIG. 1 provides a cross-sectional side view of a spindle motor for a hard disk drive, according to one aspect of the present embodiments.

Figure 2:
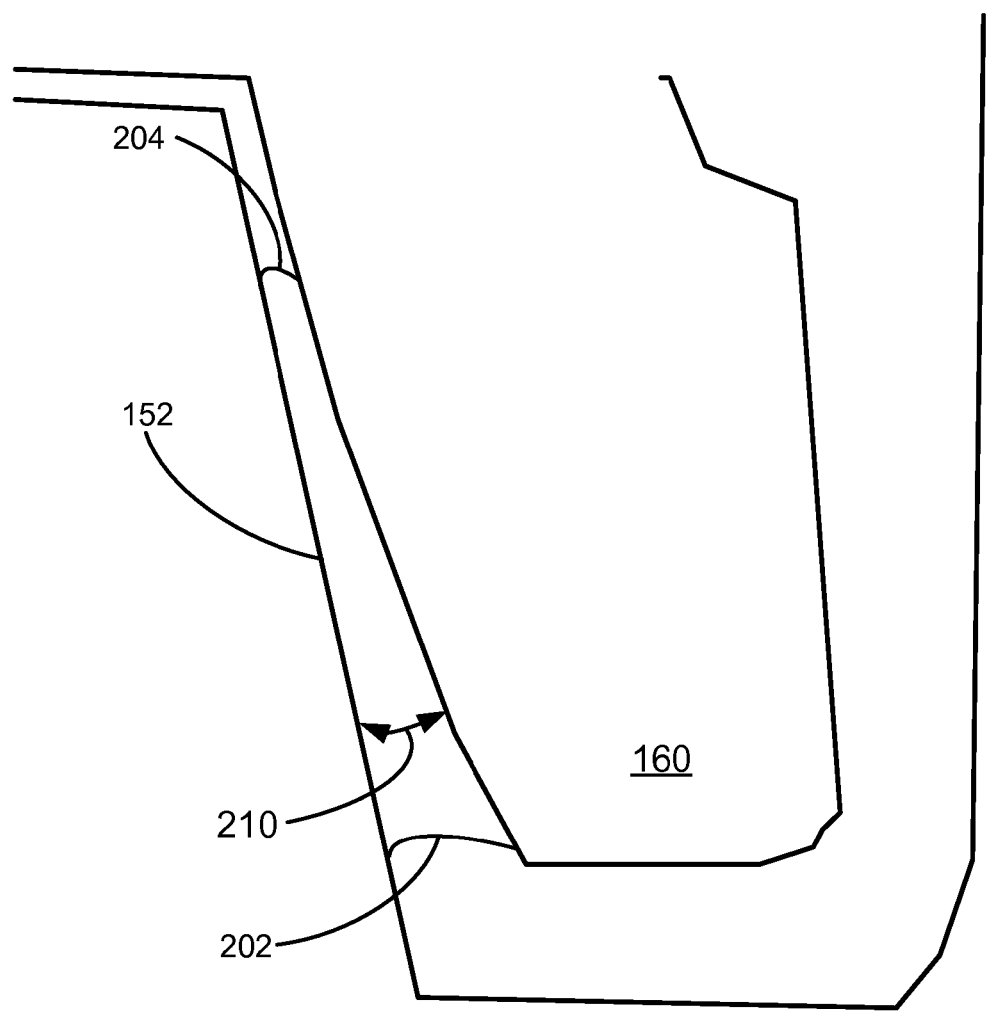

FIG. 2 provides a cross-sectional side view of a conical pump seal and the associated operational meniscus position and associated non-operational meniscus position, according to one aspect of the present embodiments.

Figure 3:
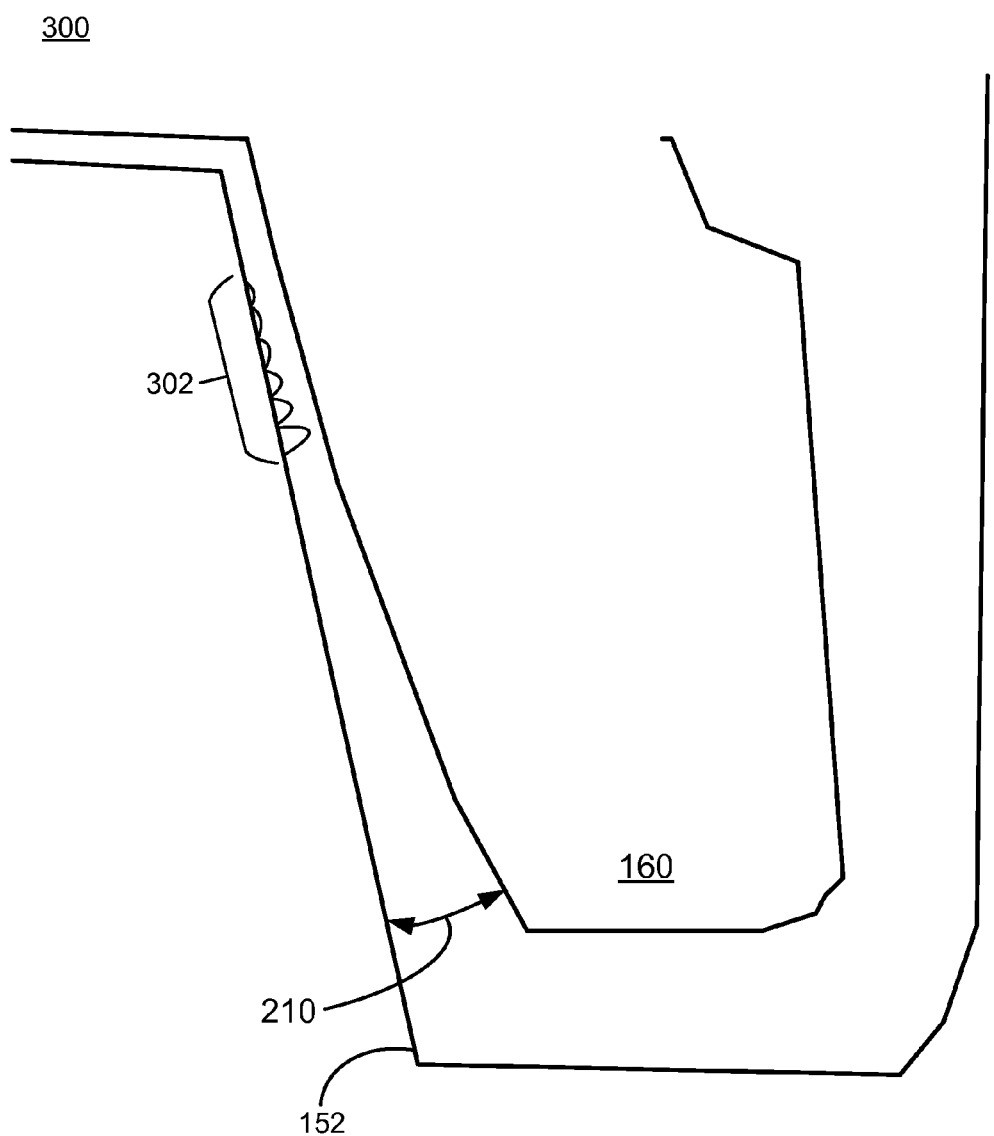

FIG. 3 provides a cross-sectional side view of a conical pump seal including grooves on a rotatable component, according to one aspect of the present embodiments.

Figure 4:
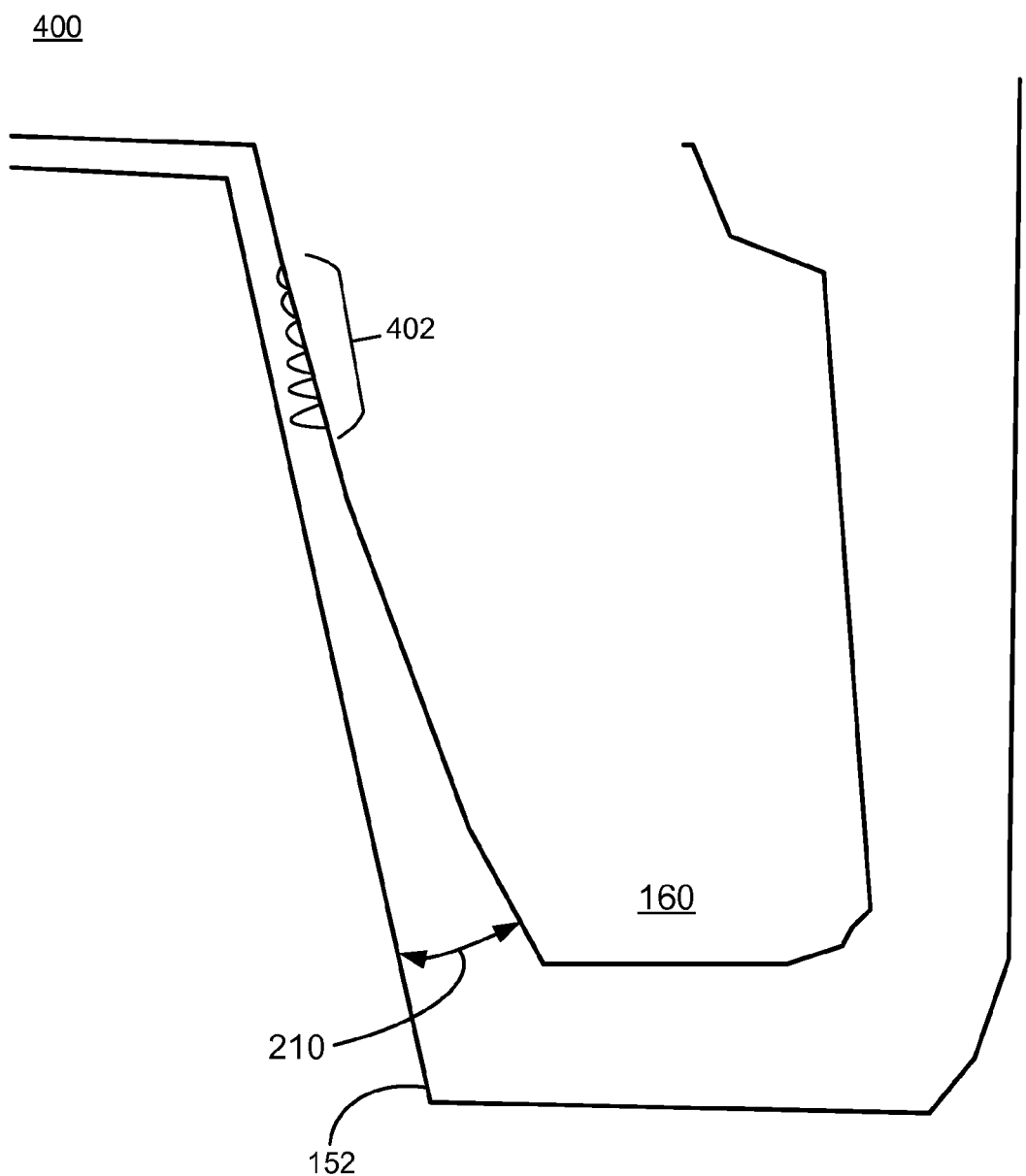

FIG. 4 provides a cross-sectional side view of a conical pump seal including grooves on a stationary component, according to one aspect of the present embodiments.

Figure 5B:
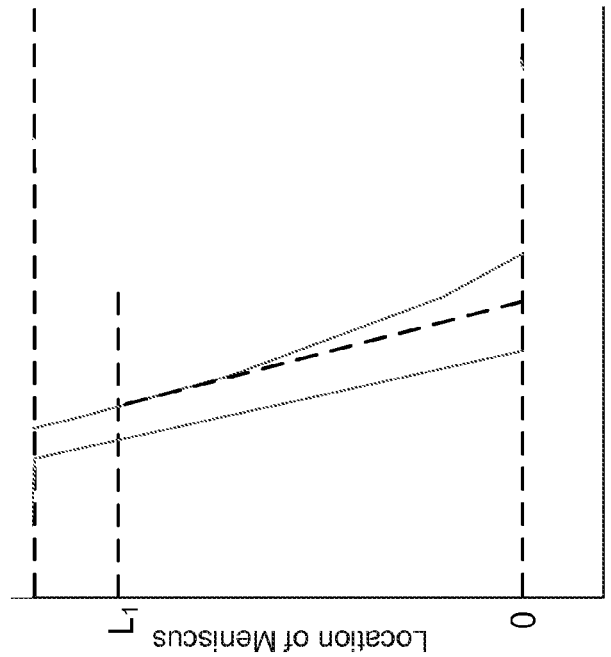
Figure 5A:
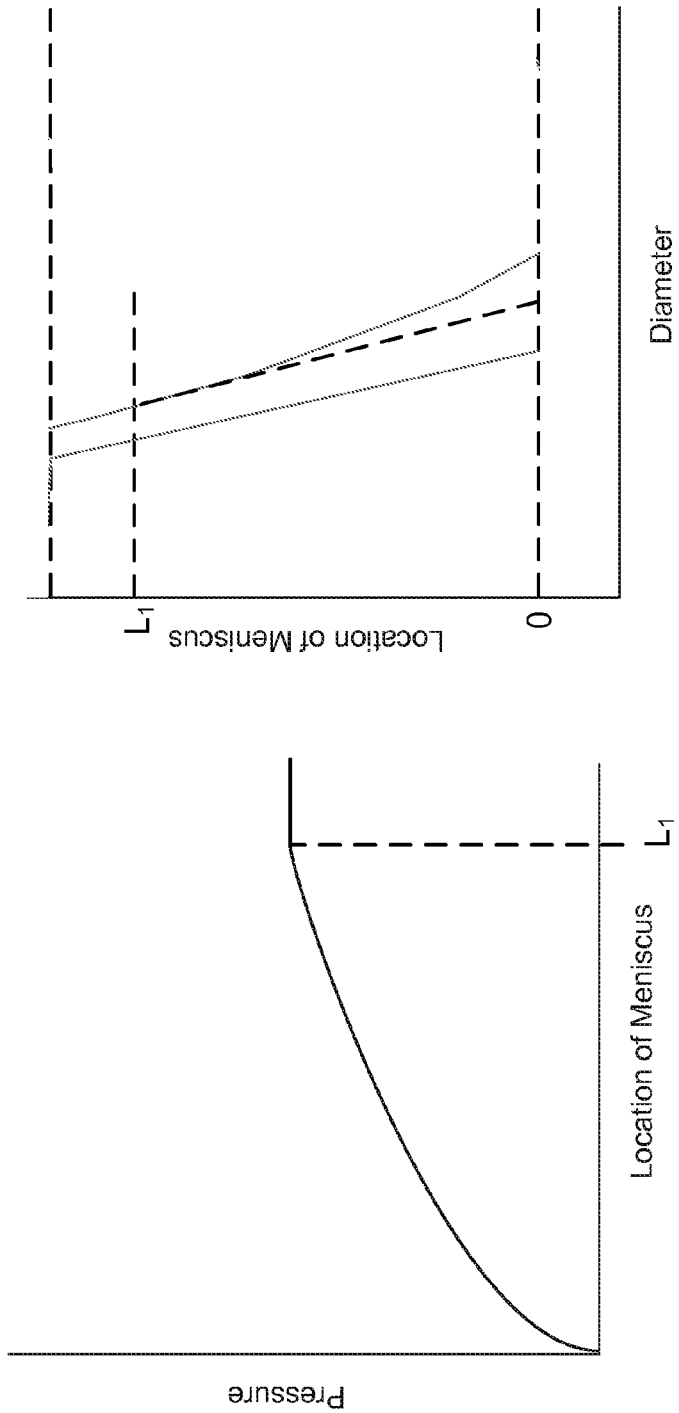

FIGS. 5A-B provides exemplary graphs of the location of a meniscus of lubricant fluid in relation to the pressure and diameter of the gap between a stationary component and a rotatable component, according to one aspect of the embodiments.

Figure 6:
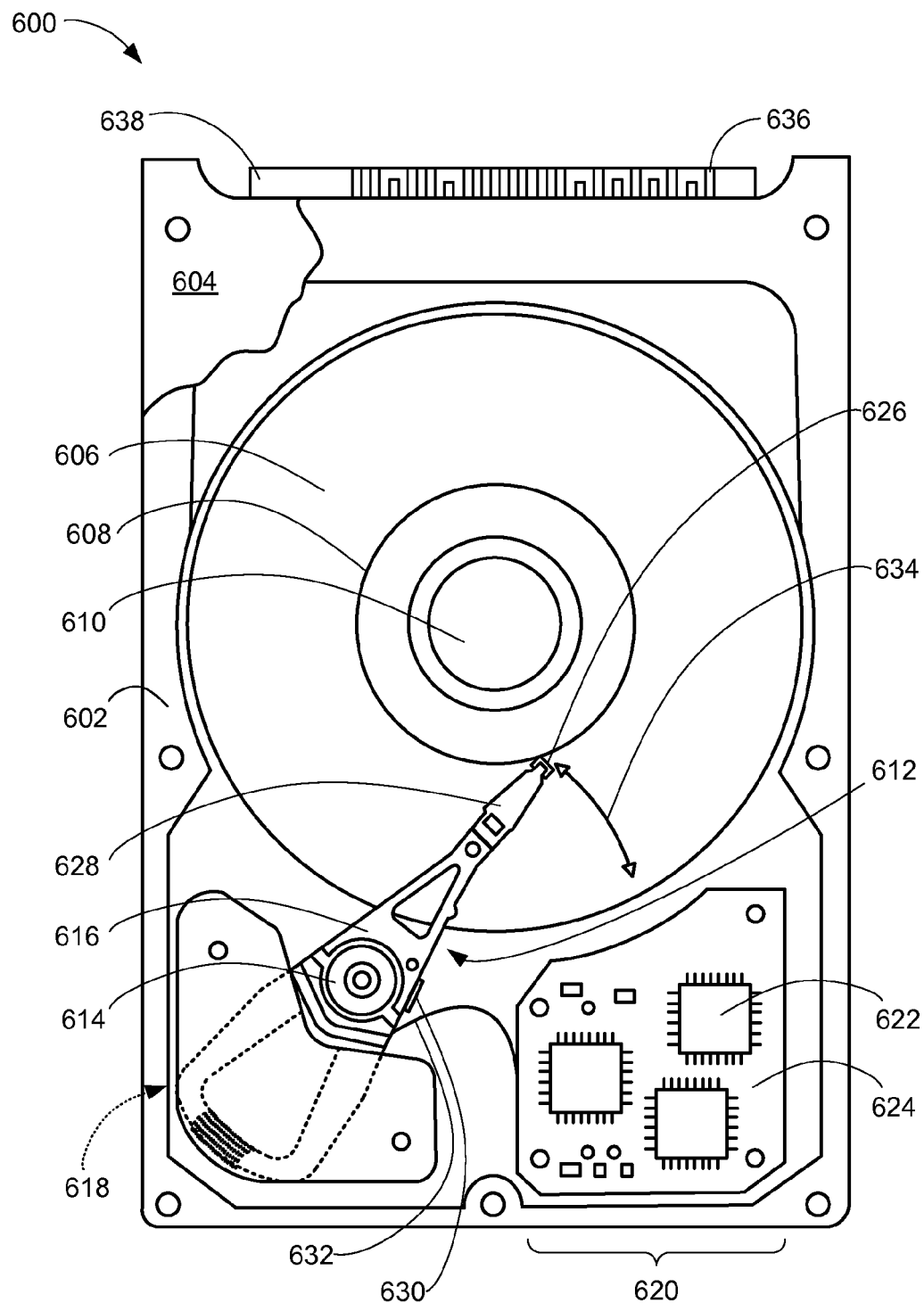

FIG. 6 illustrates an exemplary diagram of a hard drive according to one aspect of the present embodiments.

DESCRIPTION

Before particular embodiments are described in greater detail, it should be understood by persons having ordinary skill in the art that the concepts presented herein are not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art that the terminology used herein is for the purpose of describing particular embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps. For example, "first," "second," and "third" elements or steps need not necessarily appear in that order, and the elements or steps need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art.

A pump seal may exist between components of a motor and may include lubricant, which allows a rotatable component of a motor to rotate relative to a stationary component of the motor without coming into contact. Pump seals may extend either axially or radially in a linear manner. Further, pump seals may occupy substantial height of the motor. As devices are made smaller, the height available for various components including a pump seal is reduced. For example, storage devices with heights of 5 mm or 7 mm may have motors that are reduced in height and/or other dimensions for each component. This reduction in space can make designing the pumping seal difficult.

In contrast according to embodiments described herein, an angled or conical pump seal may occupy less vertical height than an axial or radial pump while providing an efficient pump seal. For example, the interface between a sleeve or hub and a top cap may be angled. A conical pumping seal may thus allow motors (e.g., and storage devices) of reduced size to operate efficiently.

When a motor is not operating (e.g., turned off), a gap may be increased between the hub assembly and the limiter of the motor. As that motor is turned on and spun up, the hub assembly will lift up due to the rotation of the hub. The motor may be axially loaded due to a magnetic component pulling the hub down. When the pumping seal is vertical the motor can fly higher than with a conical pumping seal.

The conical nature of conical pumping seal forms a tighter gap than non-conical designs. When the motor is operational or spinning the conical pumping seal is stiffer with more effective pumping. The conical pumping seal thus forms a tighter seal with a smaller gap thereby providing a stronger and more effective lubricant pumping. Vertical and horizontal pumping seals have less stiffness than the conical pumping seal described herein. Further, the increased stiffness of the conical pumping seal allows the motor to better withstand shock events.

Embodiments are further able to reduce the power consumption by reducing the amount of lubricant between the surfaces of the hub assembly and the limiter or top cap during operation. Embodiments may thus reduce the surface area of components in contact with the lubricant. For example, a portion of the lubricant (e.g., oil) may be pumped into a reservoir during operation.

FIG. 1 provides a cross-sectional side view of a spindle motor for a hard disk drive, according to one aspect of the present embodiments. FIG. 1 provides cross-sectional view of a motor (e.g., FDB motor) including parts or components that are fused according to some embodiments, as described herein. However, it should be understood that the particular embodiments provided in FIG. 1 are merely examples, and the particular embodiments are not limiting.

The FDB motor 100 in FIG. 1 includes a stationary component and a rotatable component positioned for relative rotation about a bearing system. With respect to the stationary component, the stationary component may include a shaft 110 extending from a first axial end 102 of the FDB motor 100 to a second axial end 104 of the FDB motor 100, through which the shaft 110 passes a centerline axis 101 of the FDB motor 100. The shaft 110 may be coupled to a thrust cup or cup 120 at the second axial end 104 of the FDB motor 100, which cup 120, in turn, may be coupled to a base 130 through a wall 122 of the cup 120. The stationary component may further include a stator assembly 140 coupled to the base 130, which stator assembly 140 may include a yoke 142, a plurality of stator teeth 144, and a plurality of field coils 146 singly disposed on the plurality of stator teeth 144. Adhesive bonds may be used to couple the foregoing components, but coupling may also be accomplished with epoxy, welds, or fasteners, as desired. One or more subcomponents (e.g., shaft 110) of the stationary component may be coupled to a housing for the FDB motor 100, or a housing component (e.g., top cover), which may significantly improve structural stiffness of the system while compromising little in axial space.

With respect to the rotatable component of the FDB motor 100 in FIG. 1, the rotatable component may include a sleeve-hub assembly 150 having a sleeve 152 sub-component coupled to a hub 154 sub-component. As shown, the sleeve-hub assembly 150 may be an integral sleeve-hub assembly 150 having a sleeve 152 portion and a hub 154 portion. The sleeve 152 of the sleeve-hub assembly 150 may be rotatably fitted within the cup 120 such that the cup wall 122 of the cup 120 extends over a substantial axial length of the sleeve 152, including over at least 10% to 80% of the axial length of the sleeve 152.

The sleeve 152 may include a cylindrical bore through its center in which the shaft 110 may be fitted. The hub 154 of the sleeve-hub assembly 150 may include a hub flange 156 configured to support one or more disks (e.g., magnetic recording media) for rotation. The hub 154 may further include a back iron and magnet 148 coupled to the hub 154, which back iron and magnet 148 cooperates with the stator assembly 140 to induce rotation of the hub 154 and the disk pack. Adhesive bonds may be used to couple the foregoing components, but coupling may also be accomplished with epoxy, welds, or fasteners, as desired.

The sleeve-hub assembly 150 may further include a recirculation channel 182 which is part of a recirculation system for the lubricating fluid (e.g., lubricating oil), wherein the recirculation system is primarily positioned between the stationary component and the rotatable component, and wherein the recirculation system includes the bearing system and a fluid circuit of FDB motor 100. As shown in FIG. 1, the recirculation channel 182 may be configured such that the recirculation channel 182 is angled or not parallel to the shaft 110 and/or centerline axis 101. In such a configuration, the recirculation channel 182 near the first axial end 102 of the FDB motor 100 may be at an inner radius and the recirculation channel 182 near the second axial end 104 of the FDB motor 100 may be at an outer radius, wherein the inner radius and the outer radius represent relative radial distances from the shaft 110 and/or centerline axis 101.

In some embodiments, the recirculation channel 182 may be configured such that the recirculation channel 182 is parallel to the shaft 110 and/or centerline axis 101. In such a configuration, the recirculation channel 182 near the first axial end 102 of the FDB motor 100 and the recirculation channel 182 near the second axial end 104 of the FDB motor 100 are at substantially equal radial distances from the shaft 110 and/or centerline axis 101.

A limiter cap or top cap 160 may be employed to limit axial movement of the rotatable component with respect to the stationary component. In the example shown, the facing surfaces of the limiter 160 and the sleeve-hub assembly 150 may limit the axial movement. In some embodiments, top cap 160 is attached to, or in contact with, at least one of the shaft 110 and a top cover (not shown).

FDB motor 100 may include seals 164A-B. In some embodiments, seal 164A may be a pump seal formed by lubricant between the limiter 160 and the hub assembly 150. In some embodiments, the seal 164B may be a capillary seal formed by lubricant between a sleeve-hub assembly 150 and cup 120. Seals 164A-B may be oil-air interfaces. Seals 164A-B may be coupled via recirculation channel 182.

In some embodiments, seal 164B may function as a weaker pumping seal compared to seal 164A. For example, seal 164B may have a relatively weaker meniscus compared to seal 164A. Seal 164B may act as a reservoir for lubricant. Seal 164B may have relatively more volume, less stiffness, and more slack as compared to seal 164A, which has relatively less volume, more stiffness, and less slack. The oil meniscus formed in seals 164A and 164B when the motor 100 is not spinning will equalize by way of oil movement through the recirculation channel 182.

In some embodiments, seal 164A is a dynamic conical pump seal, as described herein. In some embodiments, the dynamic conical pumping seal 164A is configured at an angle other than 0 or 90 degrees (e.g. between 0 and 90 degrees) and is formed between the limiter 160 and the sleeve 152. Sleeve 152 may have a tapered surface (e.g., in a downward axial direction) thereby forming a conical surface of the dynamic conical pumping surface 164A. Limiter 160 may have an associated surface forming an opposing surface of the dynamic conical pumping seal 164A. In some embodiments, the dynamic conical pumping seal 164A provides a dynamic pump seal configured to dynamically control stiffness in an operational motor. The dynamic conical pumping seal 164A may be configured at the design level to allow adjustment of stiffness and pumping strength. For example, the taper of the conical shape of the conical pumping seal and the gap between the sleeve 152 and the limiter 160 may each be configured at the design level.

A lubricant fluid (e.g., oil) may be inserted (e.g., injected, etc.) between a stationary component (e.g., limiter 160) and a rotatable component (e.g., hub assembly 150). In some embodiments, the lubricant fluid may be added to the motor 100 while the space between the hub assembly 150 and the limiter 160 is under vacuum conditions and capillary forces may conduct or facilitate oil into the thrust cup 120 and capillary seal 164B.

Embodiments may be configured to aid in the oil or lubricant filling process. Sleeve 152 may include opening 157 (e.g., trough or indentation in sleeve 152), which may be annular in shape. Opening 157 may be configured to provide space for limiter 160 and be configured to have lubricant added thereto. Oil may be added to opening 157 before the limiter 160 is coupled to (e.g., attached and pressed onto) shaft 110, which allows adding of the oil into a larger space as compared to after limiter 160 is coupled to sleeve 152 or hub assembly 150. When the motor 100 is spun up, oil is transferred into the motor 100 and the thrust cup 120. Inaccuracies in the fill volume of oil and loss of oil over time may be balanced by the slack space in the conical pumping seal design.

Upon spinning up of the motor 100 to operational speeds, any excess oil in the gap between the sleeve 152 and the limiter 160 may be transferred (e.g., via recirculation channel 182) to the space between the sleeve 152 and the thrust cup 120 and thus capillary seal 164B. The thrust cup 120 and capillary seal 164B may thus be configured for providing slack space for lubricant. Embodiments thereby may compensate for any inaccuracies in the amount of lubricant added to the motor 100, inaccuracies in the spacing between components (e.g., between shaft 110, hub assembly 150, and limiter 160), or losses of lubricant over time (e.g., due to evaporation).

Embodiments described herein may have pumping grooves on either of the surfaces the dynamic conical pumping seal 164A. For example, the grooves may be formed on a surface of the hub assembly 150 (e.g., on sleeve 152) or the limiter 160. The grooves may be formed via electro-chemical machining of the conical surface. For example, a substantially vertical or horizontal electrode may be used for electro-chemically machining the grooves along a conical surface such that the portions of the conical surface closest to the electrode are electro-chemically machined (e.g., grooved) relatively more while portions of the conical surface farther away from the electrode are electro-chemically machined (e.g., grooved) relatively less. The electro-chemical machining may thus form grooves of gradually varying depth (e.g., increasing depth in downward axial direction).

The grooves described herein may be configured to feed lubricant to the reservoir space of the thrust cup 120 and capillary seal 164B. Respective widths of the meniscuses of seal 164A and seal 164B may thus balance out during operation of the motor. The pumping pressure created by the dynamic conical pumping seal 164A and capillary seal 164B may thus have substantially equal surface tension and pressure during operation (e.g., substantially balanced pressure).

As the motor 100 begins to spin and powers up, the hub assembly 150 will fly higher, reducing the gap between the sleeve 152 and the limiter 160 thereby increasing the strength of conical pumping seal 164 and the stiffness of the meniscus of the dynamic conical pumping seal 164A. For example, as the hub assembly 150 flies higher, the dynamic conical pumping seal 164A becomes stiffer. Embodiments are thus configured to provide a well-defined meniscus design by forming a stiffer meniscus as the hub assembly 150 flies higher. In some embodiments, the dynamic conical pumping seal 164A allows adjustments to stiffness and pumping strength at the design level by adjusting the angle of the interface between the sleeve 152 and the limiter 160.

In some embodiments, the stiffness of the meniscus is configured to resist movement in response to external shock. The strength of the dynamic conical pumping seal 164A may vary based on the speed of the motor, the strength of the bottom thrust, the magnetic bias, the temperature, and the oil viscosity.

FIG. 2 provides a cross-sectional side view of a conical pump seal and associated operational meniscus position and associated non-operational meniscus position, according to one aspect of the present embodiments. Diagram 200 includes a sleeve 152 (e.g., of hub assembly 150), a limiter 160, and a gap 210. The gap 210 is formed between the sleeve 152 and the limiter 160. Gap 210 may be a conical gap (e.g., between vertically extending surfaces of sleeve 152 and limiter 160). The conical gap 210, or the diameter of the space between the sleeve 152 and the limiter 162, may change based on the hub assembly 150 or the sleeve 152 lifting upward during rotation. As the gap 210 changes, the pumping strength of the conical pumping seal may dynamically change. The range of the pumping strength of the conical pumping seal may thus vary based on the size of the conical gap 210 when the motor is not operating (e.g., not rotating) and the size of the conical gap 210 when the motor is operating (e.g., rotating).

In some embodiments, the conical gap 210 may have, for example, a range of approximately 15 microns. The conical nature of the conical pumping seal may allow the conical gap 210 to vary by approximately 10%. Embodiments may include various angles of the conical surface thereby allowing designs to have more varying in the gap (e.g., ≥10%).

Gap 210 may include lubricant between surfaces of the sleeve 152 and the limiter 160. FIG. 2 depicts position 202 of a meniscus of the lubricant fluid during a non-operational state of a motor (e.g., motor 100). FIG. 2 further depicts position 204 of the meniscus of the lubricant fluid during an operational state As the gap 210 is reduced in size (e.g., due to rotation of the sleeve 152), the pressure of the conical pumping seal increases thereby shifting the meniscus from position 202 toward position 204. As the gap 210 increases in size (e.g., due to slowing or stopping of rotation of sleeve 152), the pressure of the conical pumping seal decreases thereby shifting the meniscus from position 204 toward position 202.

The pumping aspect of the conical pumping seal provides stiffness, which allows the conical pumping seal to provide damping, for example after a shock event to the motor (e.g. motor 100). The conical pumping seal may thus reduce or prevent increases in momentum of motor components after a shock event. For example, the conical pumping seal may dampen a shock pulse subsequent to a shock event.

FIG. 3 provides a cross-sectional side view of a conical pump seal including grooves on a rotatable component, according to one aspect of the present embodiments. Diagram 300 includes a sleeve 152 (e.g., of a hub assembly 150), a limiter 160, and a gap 210. The gap 210 is formed between the sleeve 152 and the limiter 160. In various embodiments, the width of gap 210 may gradually increase from an inner diameter of the motor to an outer diameter of the motor.

FIG. 3 depicts grooves 302 on the sleeve 152 of hub assembly 150. The grooves 302 may have a spiral shape laterally around a surface of the sleeve 152. In some embodiments, the grooves are electro-chemically machined (ECM). In some embodiments, the depths of the grooves increase in a downward axial direction. In some embodiments, the grooves have a gradually decreasing depth in an upward axial direction along the inner diameter (ID) of the limiter 160.

The grooves may be configured to pump lubricant away from the open end or the opening between the hub assembly 150 and at an outer diameter of the limiter 160. The pumping of the grooves may be opposed by a force created by rotation of the motor (e.g., centrifugal force created by the rotation of the hub assembly 150).

The grooves 302 are configured to create pressure via pumping and thereby increase the strength of the conical pump seal formed by the lubricant fluid in the gap 210 between the sleeve 152 and the limiter 160. As the grooves pump fluid from the conical pumping seal (e.g., seal 164A) upward (e.g., toward seal 164B), the pressure increases thereby decreasing the additional pumping capability of the grooves 302.

FIG. 4 provides a cross-sectional side view of a conical pump seal including grooves on a stationary component, according to one aspect of the present embodiments. Diagram 400 includes a sleeve 152 (e.g., of a hub assembly 150), a limiter 160, and a gap 210. The gap 210 is formed between the sleeve 152 and the limiter 160.

FIG. 4 depicts grooves 402 on the limiter 160. The grooves 402 may have a spiral shape laterally around a surface of the sleeve 152. In some embodiments, the grooves are electro-chemically machined (ECM). In some embodiments, the depths of the grooves increase in a downward axial direction. In some embodiments, the grooves have a gradually decreasing depth in an upward axial direction along the inner diameter (ID) of the limiter 160.

The grooves may be configured to pump lubricant away from the open end or the opening between the hub assembly 150 and at an outer diameter of the limiter 160. The pumping of the grooves may be opposed by a force created by the rotation of the motor (e.g., centrifugal force created by the rotation of the hub assembly 150).

The grooves 402 are configured to create pressure via pumping and thereby increase the strength of the conical pump seal formed by the lubricant fluid in the gap 210 between the sleeve 152 and the limiter 160. As the grooves pump fluid from the conical pumping seal (e.g., seal 164A) upward (e.g., toward seal 164B), the pressure increases thereby decreasing the additional pumping capability of the grooves 402.

FIGS. 5A-B provide exemplary graphs of the location of a meniscus of lubricant fluid in relation to pressure and diameter of the gap between a rotatable component and a stationary component, according to one aspect of the embodiments. FIG. 5A depicts a graph of the pressure of the dynamic conical pumping seal or the gap versus the location of the meniscus of the lubricant fluid. As shown, as the pressure increases as the location of the meniscus of the lubricant approaches location $L_1$ and then levels off. In some embodiments, the pressure of the dynamic conical pumping seal is an asymptotic function of the location of the meniscus.

The pressure may be expressed as a function of the diameter of the gap by the equation:

Pressure ∝ diameter$^x$, where $x$ may be approximately ≥3

The pressure may further be expressed as a function of the gap (e.g., between the sleeve 152 and limiter 160) by the equation:

$$\text{Pressure} \propto \frac{1}{gap^2}$$

The pressure may further be expressed as a function of the gap (e.g., between the sleeve 152 and limiter 160) and the groove depth by the equation:

$$\text{Pressure} \propto \frac{1}{\left(groovedepth - \frac{3}{2}\text{gap}\right)^2 + \delta} \text{ where } \delta \text{ is an offset}$$

In some embodiments, a substantially optimal pressure may be reached at location $L_1$ when the groove depth is approximately 3/2 of the depth of the gap. If the gap size varies, the pressure drops off. The pressure of the dynamic conical pumping seal thus dynamically adjusts based on the width of the gap or the size of the dynamic conical pumping seal.

FIG. 5B depicts a graph of the location of the meniscus as a function of the diameter of the gap (e.g., between the sleeve 152 and the limiter 160). FIG. 5B shows the corresponding location $L_1$ based on the diameter of the gap. As shown, the pressure and thereby the strength of the pumping seal changes along with the diameter of the gap.

FIG. 6 illustrates an exemplary diagram of a hard drive according to one aspect of the embodiments. FIG. 6 depicts a plan view of a data storage device, including a spindle motor 610, in which embodiments as described may be implemented as shown in FDB motor 100 (FIG. 1). A disk drive 600 generally includes a base plate 602 and a cover 604 that may be disposed on the base plate 602 to define an enclosed housing for various disk drive components. The disk drive 600 includes one or more data storage disks 606 of computer-readable data storage media. Typically, both of the major surfaces of each data storage disk 606 include a plurality of concentrically disposed tracks for data storage purposes. Each data storage disk 606 is mounted on a hub 608, which in turn is rotatably interconnected with the base plate 602 and/or cover 604. Multiple data storage disks 606 are typically mounted in vertically spaced and parallel relation on the hub 608. The spindle motor 610 rotates the data storage disks 606. The spindle motor 610 may include a dynamic conical pumping seal (e.g., seal 164A), as described herein.

The disk drive 600 also includes an actuator arm assembly 612 that pivots about a pivot bearing 614, which in turn is rotatably supported by the base plate 602 and/or cover 604. The actuator arm assembly 612 includes one or more individual rigid actuator arms 616 that extend out from near the pivot bearing 614. Multiple actuator arms 616 are typically disposed in vertically spaced relation, with one actuator arm 616 being provided for each major data storage surface of each data storage disk 606 of the disk drive 600. Other types of actuator arm assembly configurations could be utilized as well, an example being an "E" block having one or more rigid actuator arm tips, or the like, that cantilever from a common structure. Movement of the actuator arm assembly 612 is provided by an actuator arm drive assembly, such as a voice coil motor 618 or the like. The voice coil motor 618 is a magnetic assembly that controls the operation of the actuator arm assembly 612 under the direction of control electronics 620.

The control electronics 620 may include a plurality of integrated circuits 622 coupled to a printed circuit board 624. The control electronics 620 may be coupled to the voice coil motor assembly 618, a slider 626, or the spindle motor 610 using interconnects that can include pins, cables, or wires (not shown).

A load beam or suspension 628 is attached to the free end of each actuator arm 616 and cantilevers therefrom. Typically, the suspension 628 is biased generally toward its corresponding data storage disk 606 by a spring-like force.

The slider 626 is disposed at or near the free end of each suspension 628. What is commonly referred to as the read/write head (e.g., transducer) is appropriately mounted as a head unit (not shown) under the slider 626 and is used in disk drive read/write operations. The head unit under the slider 626 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 626 is connected to a preamplifier 630, which is interconnected with the control electronics 620 of the disk drive 600 by a flex cable 632 that is typically mounted on the actuator arm assembly 612. Signals are exchanged between the head unit and its corresponding data storage disk 606 for disk drive read/write operations. In this regard, the voice coil motor 618 is utilized to pivot the actuator arm assembly 612 to simultaneously move the slider 626 along a path 634 and across the corresponding data storage disk 606 to position the head unit at the appropriate position on the data storage disk 606 for disk drive read/write operations.

When the disk drive 600 is not in operation, the actuator arm assembly 612 is pivoted to a "parked position" to dispose each slider 626 generally at or beyond a perimeter of its corresponding data storage disk 606, but in any case in vertically spaced relation to its corresponding data storage disk 606. In this regard, the disk drive 600 includes a ramp assembly (not shown) that is disposed beyond a perimeter of the data storage disk 606 to both move the corresponding slider 626 vertically away from its corresponding data storage disk 606 and to also exert somewhat of a retaining force on the actuator arm assembly 612.

Exposed contacts 636 of a drive connector 638 along a side end of the disk drive 600 may be used to provide connectivity between circuitry of the disk drive 600 and a next level of integration such as an interposer, a circuit board, a cable connector, or an electronic assembly. The drive connector 638 may include jumpers (not shown) or switches (not shown) that may be used to configure the disk drive 600 for user specific features or configurations. The jumpers or switches may be recessed and exposed from within the drive connector 638.

As such, as provided herein is an apparatus, including a limiter, a hub configured to rotate relative to the limiter, and a dynamic conical pumping seal in a gap between the hub and the limiter. In some embodiments, the dynamic conical pumping seal comprises grooves on a surface of the hub. In some embodiments, the grooves increase in depth in a downward axial direction. In some embodiments, the dynamic conical pumping seal comprises grooves on a surface of the limiter. In some embodiments, the gap of the dynamic conical pumping seal varies in an axial direction. In some embodiments, the dynamic conical pumping seal is coupled to a reservoir. In some embodiments, the dynamic conical pumping seal has a greater stiffness during rotation of the hub than when the hub is stationary.

Also provided herein is an apparatus, including a stationary component, a rotatable component configured to rotate relative to the stationary component, and a dynamic conical pumping seal formed between the stationary component and the rotatable component. In some embodiments, the dynamic conical pumping seal comprises grooves on a surface of the stationary component. In some embodiments, the dynamic conical pumping seal comprises grooves on a surface of the rotatable component. In some embodiments, the grooves increase in depth in a downward axial direction. In some embodiments, a width of the dynamic conical pumping seal varies in an axial direction. In some embodiments, the dynamic conical pumping seal is coupled to a reservoir. In some embodiments, the dynamic conical pumping seal has a greater stiffness during rotation of the rotatable component than when the rotatable component is stationary.

Also provided is an apparatus, including a limiter coupled to a shaft, a hub assembly configured to rotate about the shaft, and a pumping seal between a portion of the hub assembly and a portion of the limiter. The portion of the hub assembly is tapered in a downward axial direction. In some embodiments, a portion of the limiter is tapered in a downward axial direction. In some embodiments, the pumping seal comprises grooves on a surface of the limiter. In some embodiments, the grooves increase in depth in a downward axial direction. In some embodiments, the conical pumping seal comprises grooves on a surface of the hub assembly. In some embodiments, the pumping seal has a greater stiffness during rotation of the hub assembly than when the hub assembly is stationary.

While particular embodiments have been described and/or illustrated, and while these embodiments and/or examples have been described in considerable detail, it is not the intention of the applicant(s) to restrict or in any way limit the scope of the concepts presented herein to such detail. Additional adaptations and/or modifications may readily appear to persons having ordinary skill in the art, and, in its broader aspects, these adaptations and/or modifications may also be encompassed. Accordingly, departures may be made from the foregoing embodiments and/or examples without departing from the scope of the concepts presented herein, which scope is limited only by the following claims when appropriately construed.

What is claimed is:

1. An apparatus comprising:
a limiter attached to a shaft and a top cover;
a hub configured to rotate relative to the limiter wherein the limiter is stationary with respect to the shaft; and
a dynamic conical pumping seal in a gap between the hub and the limiter, wherein
the limiter has an associated surface forming an opposing surface of the dynamic conical pumping seal, and
a pumping strength of the dynamic conical seal dynamically changes as the gap between the hub and limiter changes in diameter.

2. The apparatus of claim 1, wherein the dynamic conical pumping seal comprises grooves on a surface of the hub.

3. The apparatus of claim 2, wherein the grooves increase in depth in a downward axial direction.

4. The apparatus of claim 1, wherein the dynamic conical pumping seal comprises grooves on a surface of the limiter.

5. The apparatus of claim 1, wherein the gap of the dynamic conical pumping seal varies in an axial direction.

6. The apparatus of claim 1, wherein the dynamic conical pumping seal is coupled to a reservoir.

7. The apparatus of claim 1, wherein the dynamic conical pumping seal has a greater stiffness during rotation of the hub than when the hub is stationary.

8. An apparatus comprising:
a stationary component, including a limiter;
a rotatable component configured to rotate relative to the stationary component wherein the stationary component is positioned radially outside of the rotatable component; and a conical pumping seal formed by the stationary component and the rotatable component, wherein the limiter has an associated surface forming an opposing surface of the conical pumping seal.

9. The apparatus of claim 8, wherein the conical pumping seal comprises grooves on a surface of the stationary component.

10. The apparatus of claim 9, wherein the grooves increase in depth in a downward axial direction.

11. The apparatus of claim 8, wherein the conical pumping seal comprises grooves on a surface of the rotatable component.

12. The apparatus of claim 8, wherein a width of the conical pumping seal varies in an axial direction.

13. The apparatus of claim 8, wherein the conical pumping seal is coupled to a reservoir.

14. The apparatus of claim 8, wherein the conical pumping seal has a greater stiffness during rotation of the rotatable component than when the rotatable component is stationary.

15. An apparatus comprising:
  a limiter coupled to a shaft and a top cover;
  a hub assembly, including a sleeve, configured to rotate about the shaft; and
  a pumping seal between a portion of the hub assembly and a portion of the limiter, wherein
    the limiter has an associated surface forming an opposing surface of the pumping seal, and
    the portion of the hub assembly is tapered in a downward axial direction.

16. The apparatus of claim 15, wherein a portion of the limiter is tapered in a downward axial direction.

17. The apparatus of claim 15, wherein the pumping seal comprises grooves on a surface of the limiter.

18. The apparatus of claim 17, wherein the grooves increase in depth in a downward axial direction.

19. The apparatus of claim 15, wherein the pumping seal comprises grooves on a surface of the hub assembly.

20. The apparatus of claim 15, wherein the pumping seal has a greater stiffness during rotation of the hub assembly than when the hub assembly is stationary.

* * * * *